J. SLEPIAN.
MEASURING DEVICE.
APPLICATION FILED APR. 4, 1918.
1,299,252.
Patented Apr. 1, 1919.
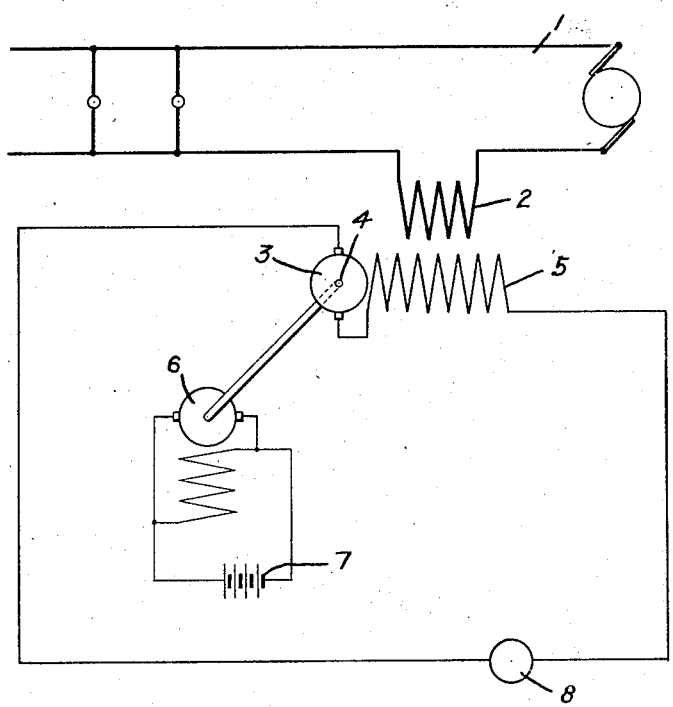
WITNESSES:
Ed. U. Herron
JHProcter
INVENTOR
Joseph Slepian
BY
Wesley G. Carr
ATTORNEY.

UNITED STATES PATENT OFFICE.

JOSEPH SLEPIAN, OF PITTSBURGH, PENNSYLVANIA, ASSIGNOR TO WESTINGHOUSE ELECTRIC & MANUFACTURING COMPANY, A CORPORATION OF PENNSYLVANIA.

MEASURING DEVICE.

1,299,252. Specification of Letters Patent. Patented Apr. 1, 1919.

Application filed April 4, 1918. Serial No. 226,612.

*To all whom it may concern:*

Be it known that I, JOSEPH SLEPIAN, a citizen of the United States, and a resident of Pittsburgh, in the county of Allegheny and State of Pennsylvania, have invented a new and useful Improvement in Measuring Devices, of which the following is a specification.

My invention relates to electrical measuring devices and particularly to current-measuring devices for high-voltage direct-current circuits.

One object of my invention is to provide a current-measuring device for direct-current circuits that shall not require the use of a current-shunt.

Another object of my invention is to provide a current-measuring instrument for high-voltage direct-current circuits that shall be insulated, at all times, from the high-voltage circuit.

A further object of my invention is to provide a device of the above-indicated character that shall be simple and inexpensive to construct and efficient in its operation.

In practising my invention, I provide a series generator having two opposing field-magnet windings and means for driving the same at a substantially constant speed. An ammeter is connected in series with the armature of the generator and one of the field-magnet windings. The other field-magnet winding is connected in series with the circuit, the current of which is to be measured. By this arrangement, the current traversing the ammeter is substantially proportional to the current traversing the circuit and, if the speed of the generator is sufficiently high, the current ratio will not be appreciably affected by change in speed.

The single figure of the accompanying drawing is a diagrammatic view of a measuring system embodying my invention.

A high-voltage direct-current circuit 1, the current of which is to be measured, is connected in series with the field-magnet winding 2 of a series generator 3. The generator 3 comprises an armature 4, the field-magnet winding 2 and a field-magnet winding 5. The generator 3 is operatively connected to a substantially constant-speed motor 6 that is supplied with energy from a source 7 of electromotive force. The armature 4 and the field-magnet winding 5 of the generator 3 are connected in series with a direct-current ammeter 8.

The windings 2 and 5 may be disposed on the same field-magnet pole pieces of the generator 3 and are so connected that they oppose one another. Thus, the flux cutting the winding of the armature 4 is proportional to $N_1 I_1 - N_2 I_2$, where $N_1$ and $N_2$ are the numbers of turns in the windings 5 and 2, respectively, and $I_1$ and $I_2$ are the currents traversing the windings 5 and 2, respectively. The electromotive force generated by the armature 4 at a predetermined speed will be $K(N_2 I_2 - N_1 I_1)$, and if R is the resistance of the circuit comprising the meter 8, $$RI_1 = K(N_2 I_2 - N_1 I_1),$$

or, $$I_1 = \frac{N_2}{N_1 + \frac{R}{K}} I_2$$

However, if $\frac{R}{K}$ is small compared with $N_1$, the above equation may be written $$I_1 = \frac{N_2}{N_1} I_2.$$

Thus, if the generator 3 is driven at a sufficiently high speed, $\frac{R}{K}$ may be made relatively small, as compared with $N_1$, and the current traversing the ammeter 8 will be proportional to the current traversing the circuit 1. It will thus be seen that change in speed of the generator 3 will not affect the current ratio between the current traversing the circuit 1 and the current traversing the ammeter 8 but will merely change the percentage accuracy of the system.

By the use of my invention, it is possible to measure the current traversing the high-voltage direct-current circuit with absolute safety to the observer and the use of current shunts, with their attendant energy losses, is obviated.

My invention is not limited to the specific structure illustrated as it may be variously modified without departing from the spirit and scope of the invention as set forth in the appended claims.

I claim as my invention:

1. A measuring system comprising a series generator having primary and secondary field-magnet windings, a direct-current ammeter connected in series with the armature and the secondary field-magnet winding of the generator, and means for connecting the primary field-magnet winding to the circuit the current of which is to be determined.

2. A measuring system for a high-voltage, direct-current circuit comprising a series generator having primary and secondary field-magnet windings, an ammeter connected in series with the secondary field-magnet winding, and means for connecting the primary winding to the direct-current circuit.

3. A measuring system for a direct-current circuit comprising a series generator, oppositely-acting field-magnet windings therefor, a meter connected in series with the armature of the generator and one of the field-magnet windings, and means for connecting the other field-magnet winding to the direct-current circuit.

4. A measuring system for a direct-current circuit comprising a series generator, oppositely-acting field-magnet windings therefor, a meter connected in series with the armature of the generator and one of the field-magnet windings, and means for connecting the other field-magnet winding in series with the direct-current circuit.

5. A measuring system for a direct-current circuit comprising a series generator, two field-magnet windings therefor, an ammeter connected in series with the armature of the generator and one of the field-magnet windings, and means for supplying the other field-magnet winding with current proportional to the current traversing the direct-current circuit.

6. A measuring system for a direct-current circuit comprising a series generator, two oppositely-acting field-magnet windings therefor, means for actuating the generator, a current-measuring instrument connected in series with the armature of the generator and one of the field-magnet windings, and means for connecting the other field-magnet winding in series with the direct-current circuit.

7. A measuring system for a direct-current circuit comprising a series generator, two oppositely-acting field-magnet windings therefor, constant-speed means for actuating the generator, an electro-responsive device connected in series with the armature of the generator and one of the field-magnet windings, and means for operatively connecting the other field-magnet winding to the direct-current circuit.

In testimony whereof, I have hereunto subscribed my name this 18th day of March, 1918.

JOSEPH SLEPIAN.